(12) United States Patent
Lan et al.

(10) Patent No.: US 7,924,661 B2
(45) Date of Patent: Apr. 12, 2011

(54) TRACK-JUMP CONTROL SYSTEM AND METHOD FOR MAINTAINING TRACK-JUMP STABILITY

(75) Inventors: Kuo-Jung Lan, Taipei County (TW); Shu-Ching Chen, Tao-Yuan Hsien (TW)

(73) Assignee: Mediatek Inc., Hsin-Chu (TW)

(*) Notice: Subject to any disclaimer, the term of this patent is extended or adjusted under 35 U.S.C. 154(b) by 0 days.

(21) Appl. No.: 12/478,254

(22) Filed: Jun. 4, 2009

(65) Prior Publication Data
US 2009/0245038 A1     Oct. 1, 2009

Related U.S. Application Data

(62) Division of application No. 11/289,139, filed on Nov. 29, 2005, now abandoned.

(51) Int. Cl.
*G11B 7/00* (2006.01)
(52) U.S. Cl. .................. 369/30.17; 369/44.28
(58) Field of Classification Search ............ 369/30.17, 369/275.1
See application file for complete search history.

(56) References Cited

U.S. PATENT DOCUMENTS

| | | |
|---|---|---|
| 6,233,207 B1 | 5/2001 | Tanaka |
| 6,314,066 B1 | 11/2001 | Hong et al. |
| 6,442,111 B1 | 8/2002 | Takahashi |
| 6,545,957 B1 | 4/2003 | Hiraga |
| 6,574,175 B1 | 6/2003 | Yoon |
| 6,614,740 B1 | 9/2003 | Park et al. |
| 6,628,575 B1 | 9/2003 | Ikeda |
| 6,628,576 B1 | 9/2003 | Watanabe |
| 2002/0003756 A1 | 1/2002 | Ma et al. |
| 2002/0167874 A1* | 11/2002 | Hayashi ............... 369/44.13 |
| 2004/0141429 A1 | 7/2004 | Kishimoto et al. |
| 2005/0128900 A1 | 6/2005 | Lo |
| 2005/0157603 A1 | 7/2005 | Tseng et al. |

FOREIGN PATENT DOCUMENTS

| | | |
|---|---|---|
| JP | 9212877 | 8/1997 |
| JP | 11283254 | 10/1999 |
| JP | 2000353318 | 12/2000 |
| JP | 2001266365 | 9/2001 |
| JP | 2005174541 | 6/2005 |

OTHER PUBLICATIONS

English abstract of JP2000353318, pub. Dec. 19, 2000.
English abstract of JP9212877, Aug. 15, 1997.
English abstract of JP11283254, Oct. 15, 1999.
English abstract of JP2001266365, Sep. 28, 2001.
English abstract of JP2005174541, Jun. 30, 2005.

* cited by examiner

*Primary Examiner* — Hoa T Nguyen
*Assistant Examiner* — Andrew J Sasinowski
(74) *Attorney, Agent, or Firm* — Thomas|Kayden

(57) ABSTRACT

A track-jump control system and method are provided. The track-jump control system applied in an optical disc drive comprises a signal generator, a protection device, a velocity estimator, and a controller. The signal generator receives the signal from the PUH and generates a tracking signal and a position signal. The protection device receives the position signal and when the position signal represents the PUH pass a predetermined position of the optical disc, the protection device generates a protection signal. The velocity estimator estimates the velocity of the PUH according to the tracking signal, and then generates a velocity signal. The controller receives the velocity signal and the protection signal, protects the velocity signal according to the protection signal, and generates a control signal to control the track-jump according to the protected velocity signal.

18 Claims, 9 Drawing Sheets

TRACK-JUMP CONTROL SYSTEM AND METHOD FOR MAINTAINING TRACK-JUMP STABILITY

CROSS REFERENCE TO RELATED APPLICATIONS

This application is a division of U.S. patent application entitled "TRACK-JUMP CONTROL SYSTEM AND METHOD FOR MAINTAINING TRACK-JUMP STABILITY," Ser. No. 11/289,139, filed on Nov. 29, 2005, the entirety of which are incorporated by reference herein.

BACKGROUND

The invention relates to a track-jump control system, and in particular, to a track-jump control system for maintaining track-jump stability.

Variety of high-capacity and re-writable recording mediums (e.g. DVDRAM) for storing various data have been introduced in recent years. DVDRAM, for example, has predefined data (also called a header) at the beginning of each sector in lands or in grooves, for addressing, and to meet a need for random access. The addressing capability of a DVDRAM is similar to that of a hard disk and very convenient.

However, if a track-jump is in process and happens to meet a header signal $S_{HEADER}$ or a land/groove (L/G) switch signal $S_{LG}$ at the same time, the tracking signal $S_{TE}$ will become fragmented, causing the track-jump to fail easily. Additionally, when the track-jump has occurred and reached the target, the track-jump will switch to close loop control. When the track-jump has switched to close loop control, the tacking signal $S_{TE}$ is always unstable in the beginning and needs a period of time to stabilize. If the track-jump happens to meet the L/G switch signal $S_{LG}$, when unstable, the track-jump will also fail easily.

SUMMARY

An object of the invention is to provide a track-jump control system applied in an optical disc drive. The optical disc drive further comprises a pick-up head for writing/reading information to/from an optical disc. The optical disc drive does a track-jump when the PUH reads the data in different track of the optical disc.

The track-jump control system being used for controlling the track-jump comprises a signal generator, a protection device, a velocity estimator, and a controller. The signal generator receives the signal from the PUH and generates a tracking signal and a position signal. The protection device receives the position signal and when the position signal represents the PUH pass a predetermined position of the optical disc, the protection device generates a protection signal. The velocity estimator estimates the velocity of the PUH according to the tracking signal, and then generates a velocity signal. The controller receives the velocity signal and the protection signal, protects the velocity signal according to the protection signal, and generates a control signal to control the track-jump according to the protected velocity signal.

Another object of the invention is to provide another track-jump control system applied in the optical disc drive comprising a signal generator, a signal re-shaper, and a controller. The signal generator receives the signal from the PUH and generates a tracking signal and a position signal. The signal re-shaper receives the position signal and the tracking signal, and when the position signal represents the PUH pass a land/ groove (L/G) switch point of the optical disc, reshapes the tracking signal to generate a re-shaped tracking signal started from where the L/G switch point according to the position signal. The controller generates a control signal to control the track-jump according to the re-shaped tracking signal.

A further object of the invention is to provide a track-jump control method applied in a track-jump control system comprising: receiving the signal from the PUH and generating a tracking signal and a position signal; when the position signal represents the PUH pass a predetermined position of the optical disc, generating a protection signal; estimating the velocity of the PUH according to the tracking signal, then generating a velocity signal; receiving the velocity signal and the protection signal; masking the velocity signal according to the protection signal; and generating a control signal to control the track-jump according to the protected velocity signal.

A further object of the invention is to provide a track-jump control method applied in a track-jump control system comprising: receiving the signal from the PUH and generating a tracking signal and a position signal; when the position signal represents the PUH pass a land/groove (L/G) switch point of the optical disc, reshapes the tracking signal to generate a re-shaped tracking signal started from where the L/G switch point according the position signal; and generating a control signal to control the track-jump according to the re-shaped tracking signal.

These and other objectives of the present invention will no doubt become obvious to those of ordinary skill in the art after reading the following detailed description of the preferred embodiment that is illustrated in the various figures and drawings.

DESCRIPTION OF THE DRAWINGS

The following detailed description, given by way of example and not intended to limit the invention solely to the embodiments described herein, will best be understood in conjunction with the accompanying drawings, in which.

DESCRIPTION

A detailed description of the invention is provided in the following. The track-jump fails easily when meets a position signal during in progress. There are various kinds of position signals, such as a header signal $S_{HEADER}$ or a land/groove (L/G) switch signal $S_{LG}$. The track-jump also fails easily if it has switched to close loop control and happens to meet the L/G switch signal $S_{LG}$ at the same time. Compared with the related art, methods and track-jump control systems according to the invention are provided to maintain track-jump stability when meeting the header signal $S_{HEADER}$ or the L/G switch signal $S_{LG}$, and particularly, when meeting an L/G switch signal $S_{LG}$ in close loop control.

Figure 1:
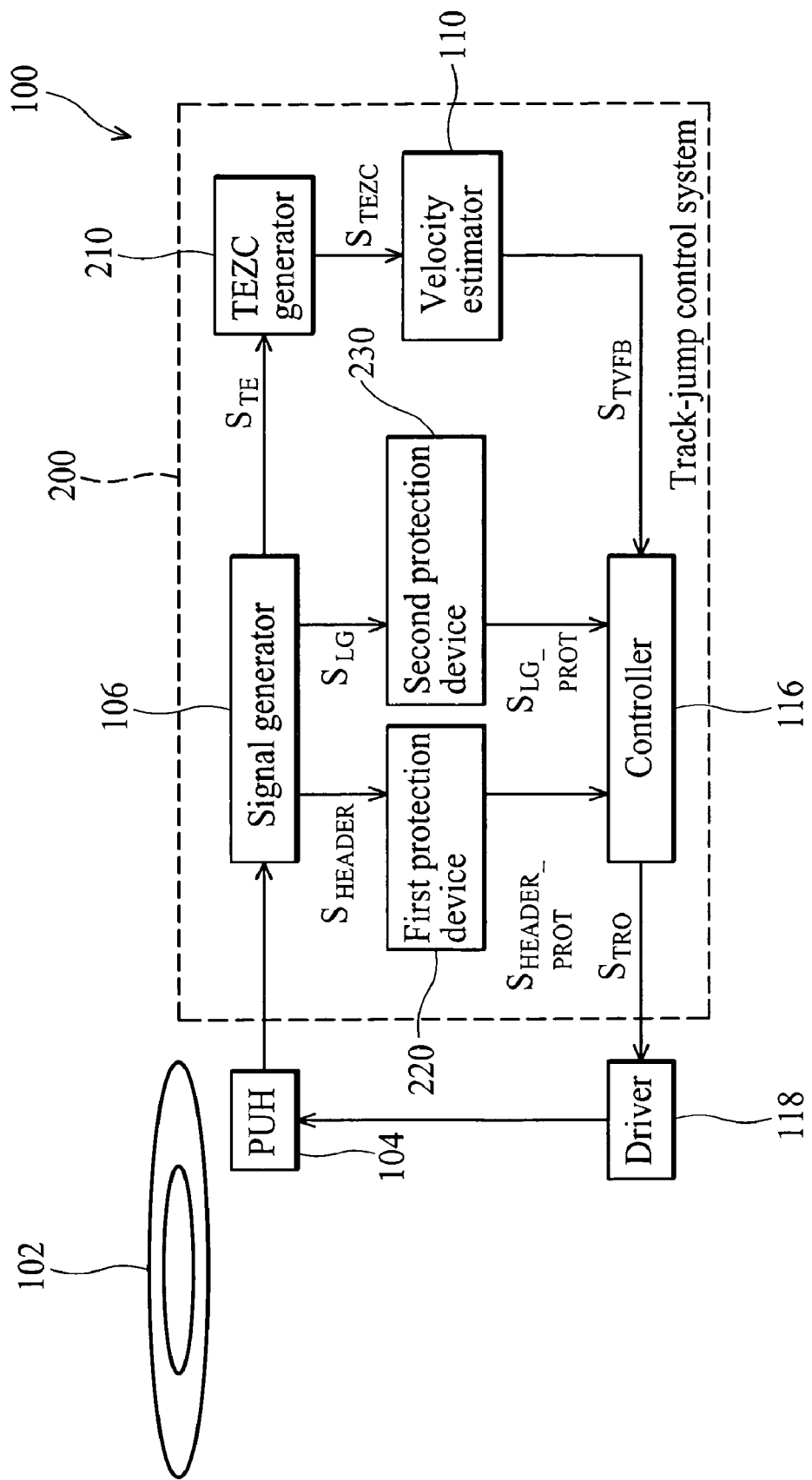
FIG. 1 shows a block diagram of an optical disc drive comprising a PUH, a track-jump control system (a signal generator, a plurality of protection devices, a TEZC generator, a velocity estimator, and a controller), and a driver according to a first embodiment of the invention.

Please refer to FIG. 1. FIG. 1 is a block diagram of a track-jump control system 200 applied in an optical disc drive 100 and a disc 102 according to a first embodiment of the invention. The optical disc drive 100 comprises the track-jump control system 200, a pick-up head (PUH) 104, and a driver 118. The track-jump control system 200 of the present invention further comprises a signal generator 106, a velocity estimator 110, a controller 116, a tracking error zero crossing (TEZC) generator 210, and a plurality of protection devices 220 and 230.

The disc 102 is an optical recording media, e.g. a DVD-RAM disc. The PUH 104 reads data from the disc 102 to generate a radio frequency (RF) signal corresponding to the data in the disc 102. The signal generator 106 receives the RF signal and generates a tracking signal $S_{TE}$, a header signal $S_{HEADER}$, and an L/G switch signal $S_{LG}$. There are various methods for generating the tracking signal $S_{TE}$, the header signal $S_{HEADER}$, or the L/G switch signal $S_{LG}$ when the PUH meeting a header or an L/G switch point. In the present invention, the tracking signal means the signal generated from the PUH for monitoring whether the PUH is tracked on the track of the optical disc 102 or not. There is many kinds of tracking signal can be used to do so. In the following description, it takes the tracking error signal $S_{TE}$ to be the example. Since these methods and tracking signals are familiar to those skilled in the art, further discussion is omitted for the sake of brevity.

The velocity estimator 110 estimates a seek velocity for track-jump and generates a velocity signal $S_{TVFB}$ according to a tracking error zero crossing signal $S_{TEZC}$ from the TEZC generator 210 (in the track-jump control system 200) to control the track-jump velocity during track-jump. In the present invention, the velocity signal means the signal generated from the velocity estimator for monitoring the seeking or following velocity. There is many kinds of velocity signal can be used to do so. In the following description, it takes the tracking velocity feedback signal $S_{TVFB}$ to be the example. Since the above elements are familiar to those skilled in the art, detailed description of the functionality and operation is omitted for the sake of brevity.

The controller 116 generates a control signal $S_{TRO}$ to control the PUH 104 to perform track-jump. In the present invention, the velocity signal $S_{TVFB}$ is one of the reference signals for the controller 116 to generate the control signal $S_{TRO}$. Since the functionality and operation of the controller 116 and the control signal $S_{TRO}$ is familiar to those skilled in the art, detailed description thereof is also omitted for brevity. Further description of the track-jump control system 200 is provided in the following.

The TEZC generator 210 is utilized to processes the tracking signal $S_{TE}$ to generate a TEZC signal $S_{TEZC}$. The protection devices 220 and 230 generate a header protection signal $S_{HEADER\_PROT}$ and an L/G protection signal $S_{LG\_PROT}$, respectively. The header protection signal $S_{HEADER\_PROT}$ and the L/G protection signal $S_{LG}$ is utilized to mask the velocity signal $S_{TVFB}$ if the velocity signal $S_{TVFB}$ starts to control the controller 116 improperly (which may cause track-jump failure) when a track-jump meets the header signal $S_{HEADER}$ or the L/G switch signal $S_{LG}$ during in progress.

Figure 2:
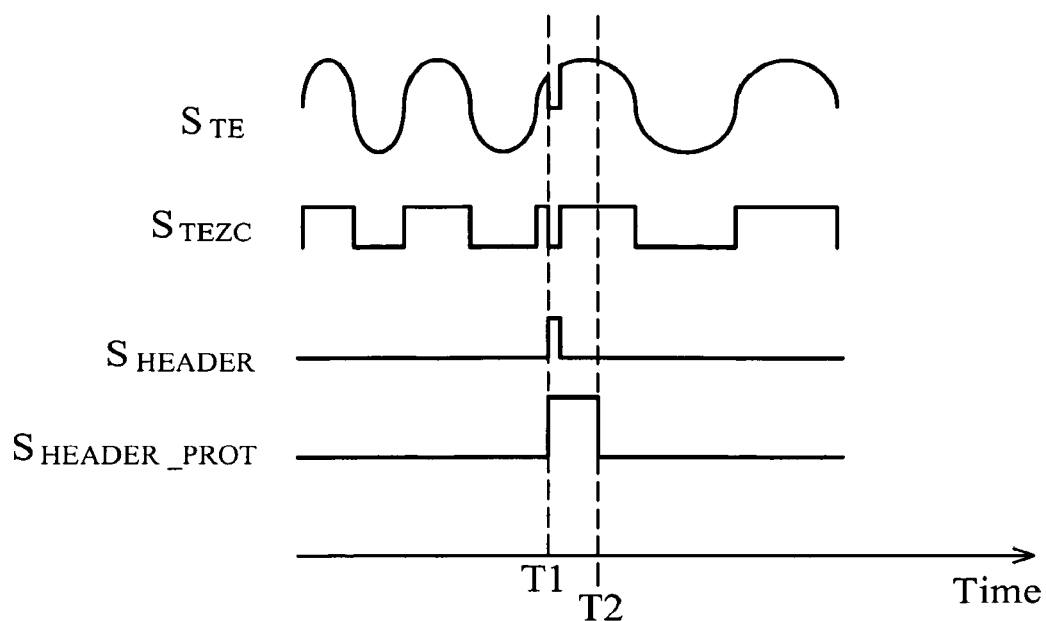
FIG. 2 shows a waveform diagram of the tracking signal $S_{TE}$, the tracking error zero crossing signal $S_{TEZC}$, the header signal $S_{HEADER}$, and the header protection signal $S_{HEADER\_PROT}$ output as shown in FIG. 1.

The functionality and operation of the first protection device 220 is provided first. Please refer to FIG. 1 and FIG. 2 at the same time. FIG. 2 shows a waveform diagram of the tracking signal $S_{TE}$, the tracking error zero crossing signal $S_{TEZC}$, the header signal $S_{HEADER}$, and the header protection signal $S_{HEADER\_PROT}$ output from the first protection device 220. When the optical disc drive performs the track-jump process and the PUH 104 happens to meet the header of the disc 102 at time T1, the signal generator 106 generates a fragmented tracking signal $S_{TE}$ and the header signal $S_{HEADER}$. The TEZC generator 210 then generates a fragmented tracking error zero crossing signal $S_{TEZC}$ according to the fragmented tracking signal $S_{TE}$. In the related art, the velocity estimator 110 receives the fragmented tracking error zero crossing signal $S_{TEZC}$ and outputs the velocity signal $S_{TVFB}$ to improperly control the controller 116. In order to prevent the controller 116 from being improperly controlled, the first protection device 220 generates the header protection signal $S_{HEADER\_PROT}$ to mask the velocity signal $S_{TVFB}$ during a specific duration (T1~T2). There are several ways to mask the velocity signal $S_{TVFB}$. For example, the controller 116 can utilize the previous velocity signal $S_{TVFB}$ to control the controller 116 rather than the velocity signal $S_{TVFB}$ when it receives the header protection signal $S_{HEADER\_PROT}$ at time T1. The controller 116 can also bypass the velocity signal $S_{TVFB}$ when it receives the header protection signal $S_{HEADER\_PROT}$ at time T1.

Figure 3:
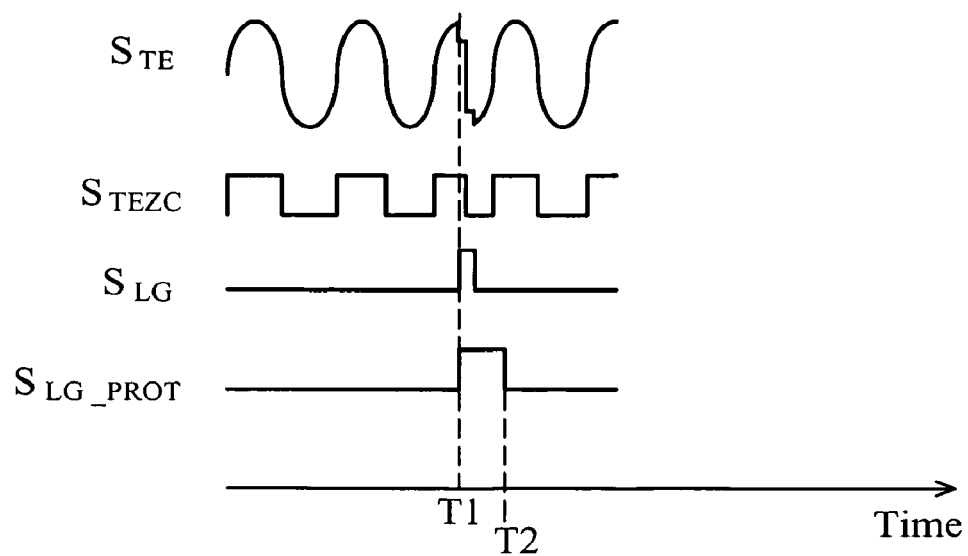
FIG. 3 shows another waveform diagram of the tracking signal $S_{TE}$, the tracking error zero crossing signal $S_{TEZC}$, the L/G switch signal $S_{LG}$, and the L/G protection signal $S_{LG\_PROT}$ output as shown in FIG. 1.

The functionality and operation of the second protection device 230 is provided in the following. Please refer to FIG. 1 and FIG. 3 at the same time. FIG. 3 shows another waveform diagram of the tracking signal $S_{TE}$, the tracking error zero crossing signal $S_{TEZC}$, the L/G switch signal $S_{LG}$, and the L/G protection signal $S_{LG\_PROT}$. When the optical disc drive performs the track-jump process and the PUH 104 happens to meet the L/G switch point of the disc 102 at time T1, the signal generator 106 generates a fragmented tracking signal $S_{TE}$. Similarly, in the related art, the fragmented tracking signal $S_{TE}$ finally causes the velocity signal $S_{TVFB}$ to control the controller 116 improperly. In order to prevent the controller 116 from being improperly controlled, the second protection device 230 generates the L/G protection signal $S_{LG\_PROT}$ to mask the velocity signal $S_{TVFB}$ during a specific duration (T1~T2). A detailed description of masking is omitted here as it was previously described. Additionally, the end time T2 of the duration (T1~T2) can be determined by the seeking velocity at time T1 or be held until the next TEZC signal $S_{TEZC}$.

Figure 4:
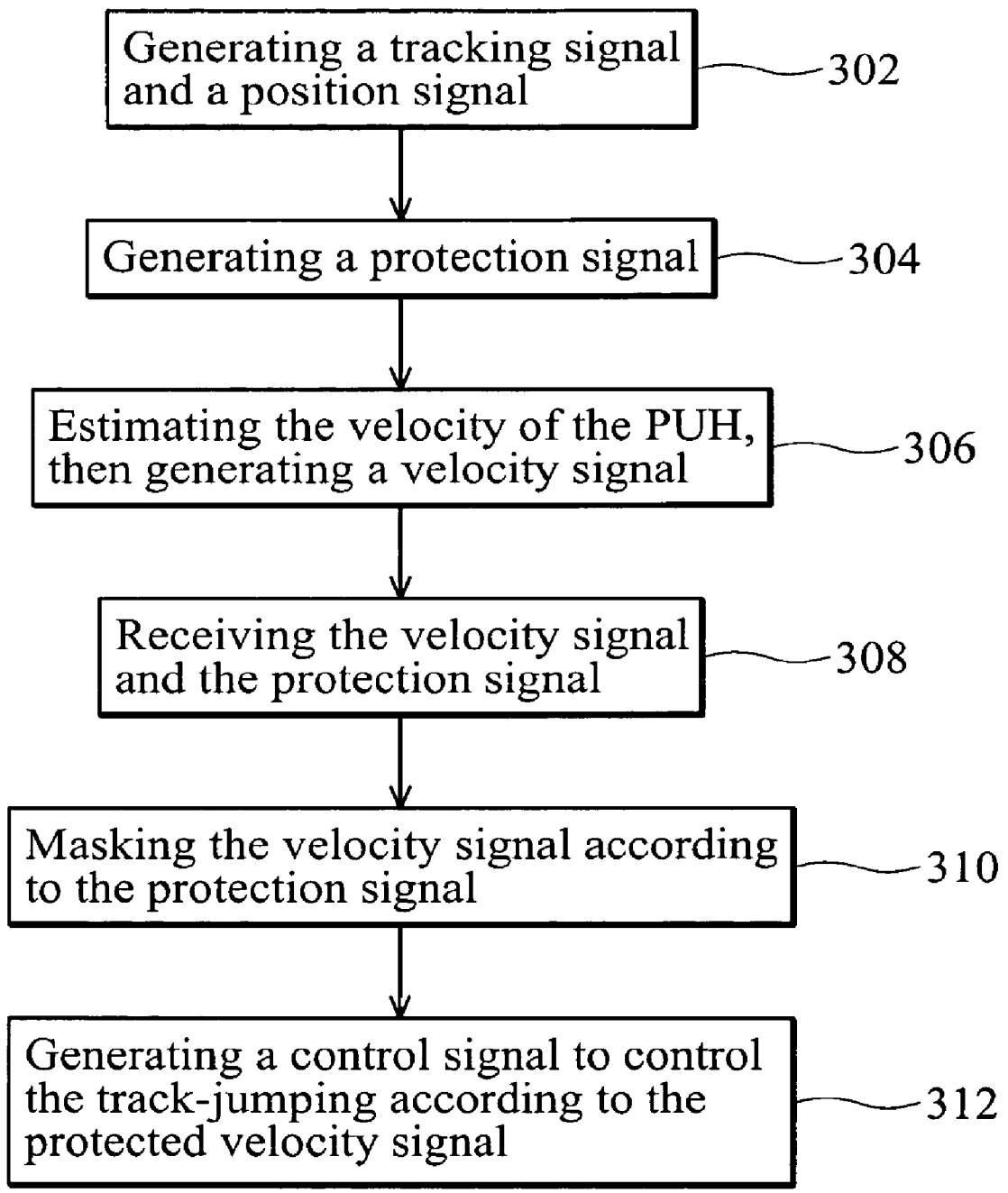
FIG. 4 shows a flow chart of the track-jump control method according to the first embodiment of the invention.

Please refer to FIG. 4. FIG. 4 shows a flow chart of the track-jump control method according to the first embodiment of the invention. A detailed description is given in the following.

Step 302: Receiving the signal from the PUH and generating a tracking signal and a position signal.

Step 304: Generating a protection signal when the position signal represents the PUH pass a predetermined position of the optical disc.

Step 306: Estimating the velocity of the PUH according to the tracking signal, then generating a velocity signal.

Step 308: Receiving the velocity signal and the protection signal.

Step 310: Masking the velocity signal according to the protection signal.

Step 312: Generating a control signal to control the track-jump according to the protected velocity signal.

Figure 5:
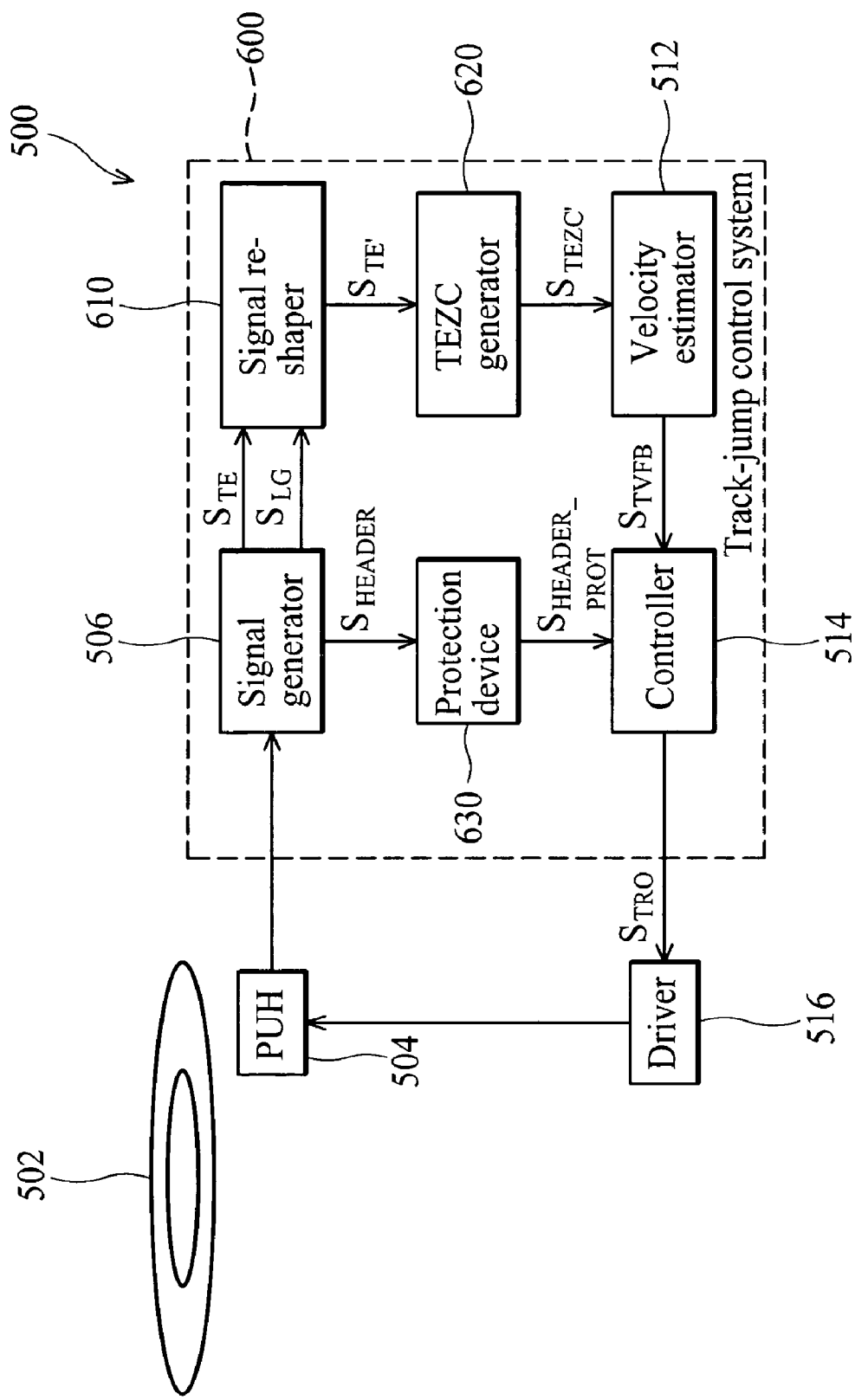
FIG. 5 shows another block diagram of an optical disc drive comprising a PUH, a track-jump control system (a signal generator, a signal re-shaper, a TEZC generator, a protection device, a velocity estimator, and a controller), and a driver according to a second embodiment of the invention.

Please refer to FIG. 5. FIG. 5 is another block diagram of a track-jump control system 600 applied in an optical disc drive 500 and a disc 502 according to a second embodiment of the invention. The optical disc drive 500 comprises the track-jump control system 600, a PUH 504, and a driver 516. The track-jump control system 600 of the present invention further comprises a signal re-shaper 610, a tracking error zero crossing (TEZC) generator 620, a signal generator 506, a velocity estimator 512, a controller 514, and a protection device 630. A detailed description of the track-jump control system 600 will be provided later. Since the functionality of the other elements is the same as those in FIG. 1, a detailed description thereof is omitted here for the sake of brevity. Further description of the track-jump control system 600 is provided in the following.

The signal re-shaper 610 reshapes a tracking signal $S_{TE}$ from the signal generator 506 to output a re-shaped tracking signal $S_{TE'}$. The TEZC generator 620 processes the tracking signal $S_{TE'}$ to generate a TEZC signal $S_{TEZC'}$. The protection devices 630 generates a header protection signal $S_{HEADER\_PROT}$ to mask the velocity signal $S_{TVFB}$ when a track-jump meets the header during in progress. Since the operation and functionality of the protection devices 630 is similar to the first protection devices 220, further description is omitted for the sake of brevity. A detailed description of the signal re-shaper 610 is provided in the following.

Figure 6:
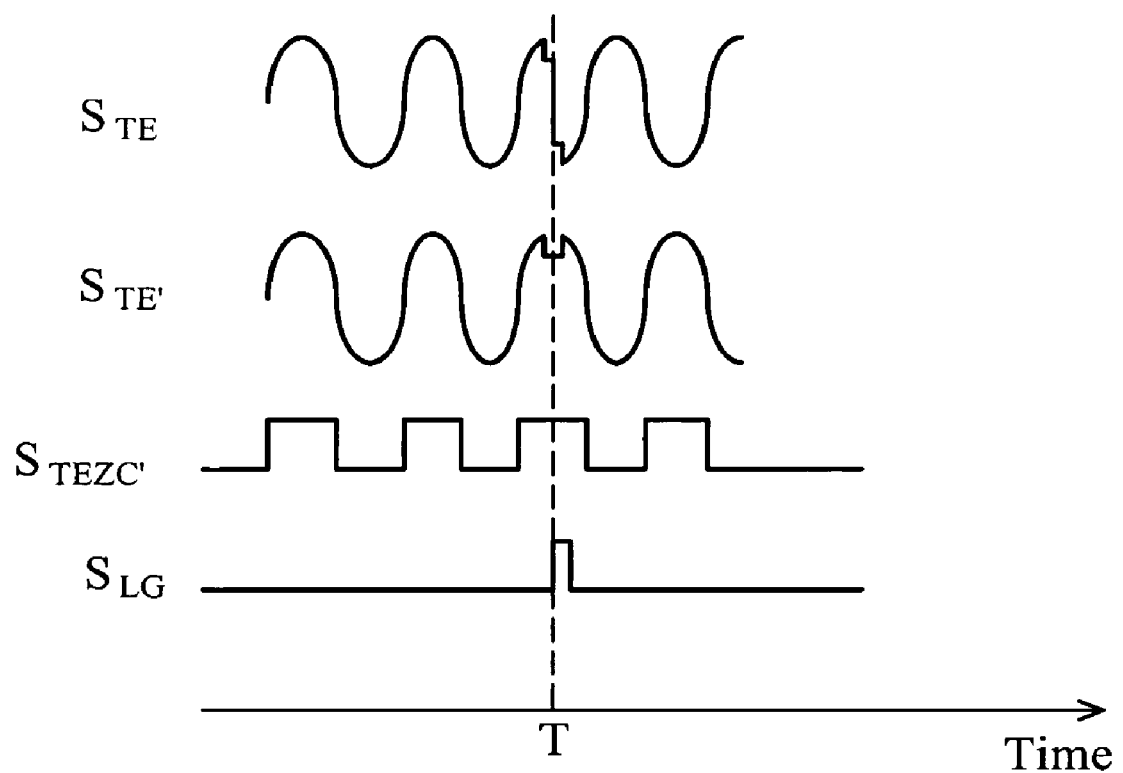
FIG. 6 shows a waveform diagram of the tracking signals $S_{TE}$ and $S_{TE'}$, the tracking error zero crossing signal $S_{TEZC'}$ output from the re-shaper, and the L/G switch signal $S_{LG}$ as shown in FIG. 5.

Please refer to FIG. 5 and FIG. 6 at the same time. FIG. 6 shows a waveform diagram of the tracking signals $S_{TE}$ and $S_{TE'}$, the tracking error zero crossing signal $S_{TEZC'}$ output from the re-shaper 610, and the L/G switch signal $S_{LG}$. When the optical disc drive 500 performs the track-jump process and the PUH 504 happens to meet the L/G switch signal $S_{LG}$ at time T, the L/G switch point, the signal generator 106 generates a fragmented tracking signal $S_{TE}$. The signal re-shaper 610 re-shapes the fragmented tracking signal $S_{TE}$ to output the re-shaped tracking signal $S_{TE'}$. In other words, the tracking signal $S_{TE}$ is inverted by 180 degrees at time T. The TEZC generator 620 then generates the re-shaped tracking error zero crossing signal $S_{TEZC'}$ according to the re-shaped tracking signal $S_{TE'}$. Finally, the velocity estimator 512 receives the re-shaped tracking error zero crossing signal $S_{TEZC'}$ and outputs the velocity signal $S_{TVFB}$ to properly control the controller 514.

Figure 7:
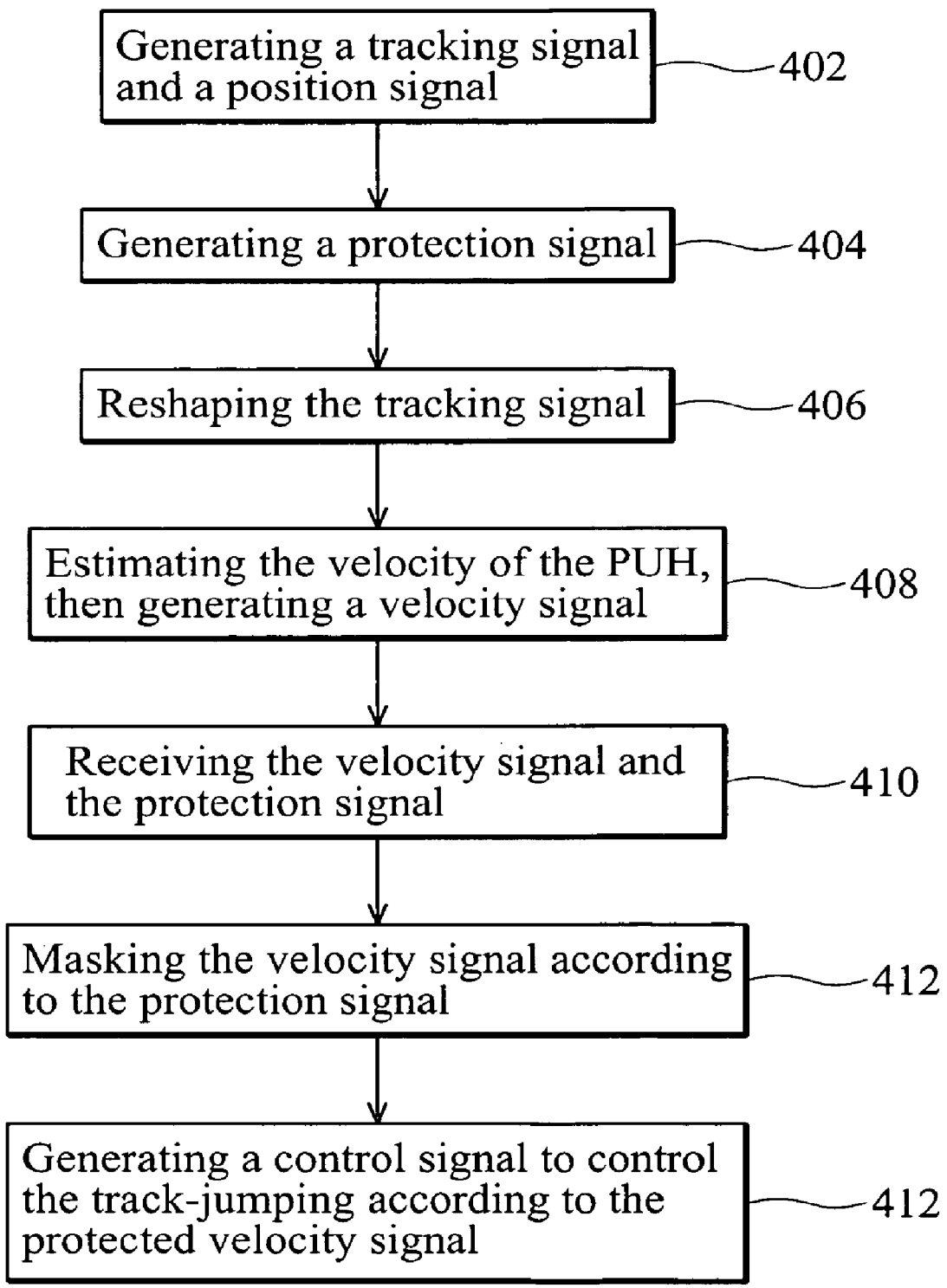
FIG. 7 shows a flow chart of the track-jump control method according to the second embodiment of the invention.

Please refer to FIG. 7. FIG. 7 shows a flow chart of the track-jump control method according to the second embodiment of the invention. A detailed description is given in the following.

Step 402: Receiving the signal from the PUH and generating a tracking signal and a position signal.

Step 404: Generating a protection signal when the position signal represents the PUH pass a predetermined position of the optical disc.

Step 406: Reshaping the tracking signal started from where the L/G switch point according the position signal. The tracking signal is inverted by 180 degrees.

Step 408: Estimating the velocity of the PUH according to the tracking signal, then generating a velocity signal.

Step 410: Receiving the velocity signal and the protection signal.

Step 412: Masking the velocity signal according to the protection signal.

Step 414: Generating a control signal to control the track-jump according to the protected velocity signal.

Figure 8:
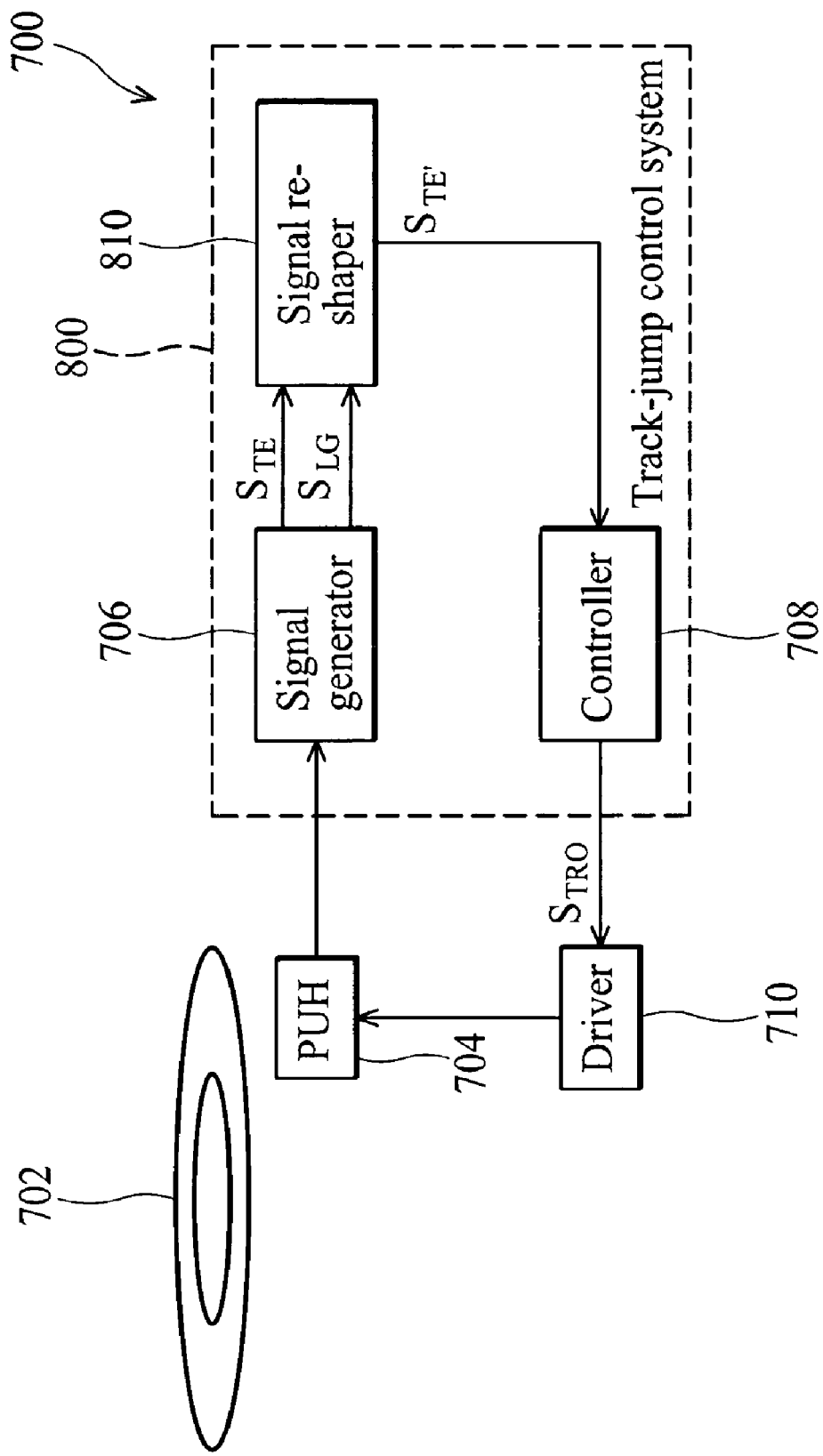
FIG. 8 shows another block diagram of an optical disc drive 700 according to a third embodiment of the invention.

Please refer to FIG. 8. FIG. 8 is another block diagram of a track-jump control system 800 applied in an optical disc drive 700 and a disc 702 according to a third embodiment of the invention. The optical disc drive 700 comprises the track-jump control system 800, a pick-up head (PUH) 704, and a driver 710. The track-jump control system 800 of the invention further comprises a signal generator 706, a signal re-shaper 810, and a controller 708. A detailed description of the signal re-shaper 810 is provided later. Since the functionality of the other elements is the same as those in FIG. 1, a detailed description thereof is omitted here for the sake of brevity.

Figure 9:
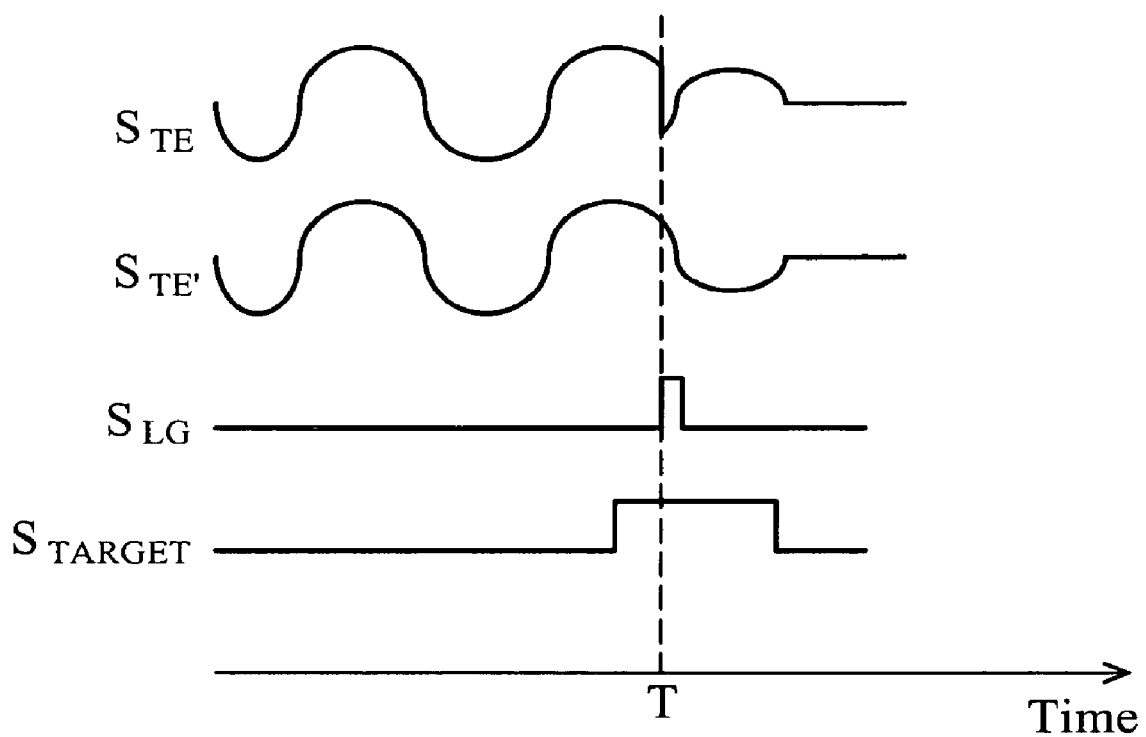
FIG. 9 shows a waveform diagram of the tracking signals $S_{TE}$ and $S_{TE'}$, the L/G switch signal $S_{LG}$, and the target track signal $S_{TARGET}$ as shown in FIG. 8.

Please refer to FIG. 9 and FIG. 8 at the same time. FIG. 9 shows a waveform diagram of the tracking signals $S_{TE}$ and $S_{TE'}$, the L/G switching signal $S_{LG}$, and the target track signal $S_{TARGET}$. The target track signal $S_{TARGET}$ is pulled high when PUH has reached the target track and then it will be switched to closed loop. When the track-jump has switched to close loop control in the beginning, the tacking signal $S_{TE}$ is unstable. The signal re-shaper 810 keeps detecting whether an L/G switch point is met for a predetermined period of time. If the L/G switch point is detected at time T (the L/G switch signal $S_{LG}$ is generated), the polarity of the tacking signal $S_{TE}$ is inverted by 180 degrees. In order to modify the inverted tacking error signal $S_{TE}$, the signal re-shaper 810 will re-shape the tracking signal $S_{TE}$ to the continuous tracking signal $S_{TE'}$. After reshaping the tracking signal $S_{TE}$, the controller 708 can receive the continuous tracking signal $S_{TE'}$ and output the proper control signal $S_{TRO}$ to the driver 710.

Figure 10:
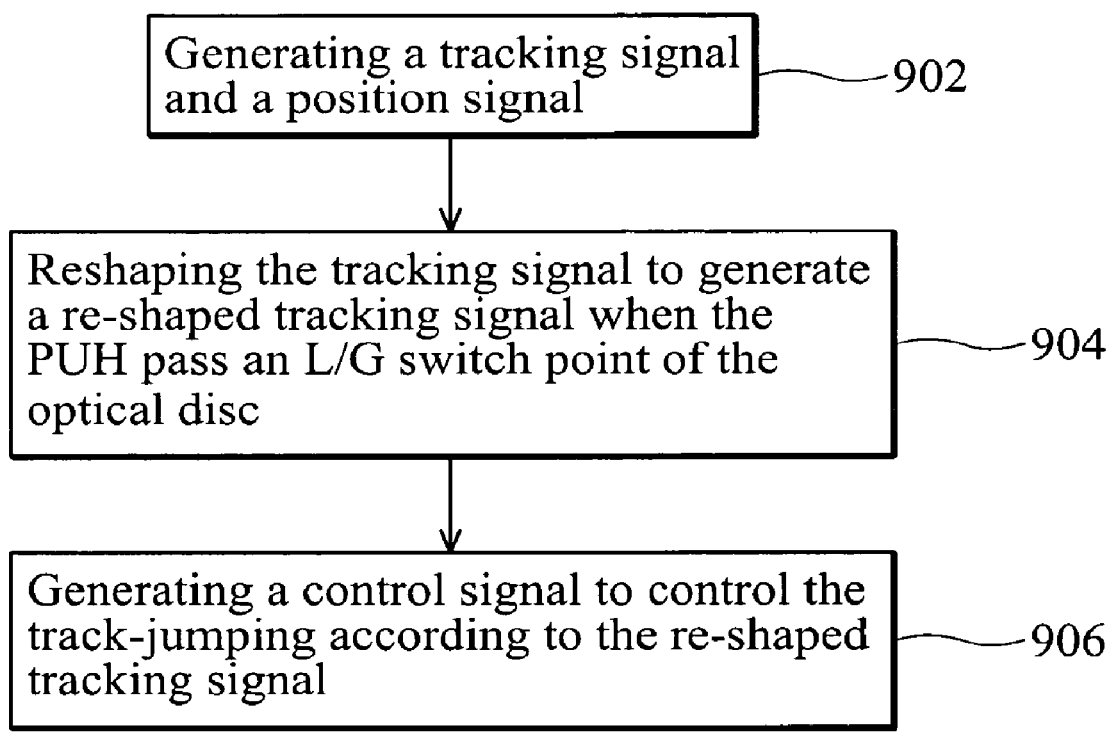
FIG. 10 shows a flow chart of the track-jump control method according to the third embodiment of the invention.

Please refer to FIG. 10. FIG. 10 shows a flow chart of the track-jump control method according to the second embodiment of the invention. A detailed description is given in the following.

Step 902: Receiving the signal from the PUH and generating a tracking signal and a position signal.

Step 904: Reshaping the tracking signal to generate a re-shaped tracking signal started from where the L/G switch point according to the position signal when the position signal represents the PUH pass a land/groove (L/G) switch point of the optical disc.

Step 906: Generating a control signal to control the close look of the track-jump according to the re-shaped tracking signal.

By the above description, the invention adapts a proper protection method and device to protect the signal used for controlling the track-jump process of the PUH. So the PUH can do track-jump stably without the problem happened in the conventional technology.

While the invention has been described by way of example and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A track-jump control system applied in an optical disc drive, the optical disc drive further comprising a pick-up head (PUH) for writing/reading information to/from an optical disc, the optical disc drive doing a track-jump when the PUH reads the data in different track of the optical disc, the track-jump control system being used for controlling the track-jump, comprising:

a signal generator coupled to the PUH, for receiving a signal from the PUH and generating a tracking signal and a position signal;

a protection device coupled to the signal generator, for receiving the position signal and when the position signal that represents the PUH passes a predetermined position of the optical disc, the protection device generating a protection signal;

a velocity estimator for estimating the velocity of the PUH according to the tracking signal, then generating a velocity signal; and a controller coupled to the protection device and the velocity estimator, for receiving the velocity signal and the protection signal, protecting the velocity signal according to the protection signal, and generating a control signal to control the optical disc drive doing the track-jump according to the protected velocity signal.

2. The track-jump control system according to claim 1, wherein the velocity signal overlapped with the protection signal is masked to be replaced with a previous velocity signal.

3. The track-jump control system according to claim 1, wherein the velocity signal overlapped with the protection signal is masked to be bypassed.

4. The track-jump control system according to claim 1, wherein a mask duration for masking the velocity signal is determined by the velocity of the PUH at a time the masking begins.

5. The track-jump control system according to claim 1, wherein a mask duration for masking the velocity signal is held until next velocity signal comes in.

6. The track-jump control system according to claim 1, wherein the predetermined position is selected at least one from the group consisted of a header and a land/groove switch point.

7. The track-jump control system according to claim 6, wherein the protection device further receives the tracking signal and reshapes the tracking signal started from where the L/G switch point according to the position signal.

8. The track-jump control system according to claim 7, wherein the protection device further receives the tracking signal and inverts the tracking signal by 180 degrees started from where the L/G switch point according the position signal.

9. The track-jump control system according to claim 1, wherein the tracking signal is fragmented when the position signal represents that the PUH passes the predetermined position of the optical disc.

10. A track-jump control method applied in a optical disc drive, the optical disc drive further comprising a pick-up head (PUH) for writing/reading information from an optical disc, the optical disc drive doing a track-jump when the PUH reads the data in different track of the optical disc, the track-jump control method being used for controlling the track-jump, comprising:

receiving a signal from the PUH and generating a tracking signal and a position signal;

when the position signal that represents the PUH passes a predetermined position of the optical disc, generating a protection signal;

estimating the velocity of the PUH according to the tracking signal, then generating a velocity signal;

receiving the velocity signal and the protection signal;

masking the velocity signal according to the protection signal; and generating a control signal to control the track-jump according to the protected velocity signal.

11. The track-jump control method according to claim 10, wherein the velocity signal overlapped with the protection signal is masked to be replaced with a previous velocity signal.

12. The track-jump control method according to claim 10, wherein the velocity signal is masked to be bypassed.

13. The track-jump control method according to claim 10, wherein a mask duration for masking the velocity signal is determined by a seek velocity of the PUH at a time the masking begins.

14. The track-jump control method according to claim 10, wherein a mask duration for masking the velocity signal is held until next tracking signal comes in.

15. The track-jump control method according to claim 10, wherein the predetermined position is selected at least one from the group consisted of a header and a land/groove (L/G) switch point.

16. The track-jump control method according to claim 15, further comprising the following step:

reshaping the tracking signal started from where the L/G switch point according the position signal.

17. The track-jump control method according to claim 16, wherein the tracking signal is inverted by 180 degrees.

18. The track-jump control method according to claim 10, wherein the tracking signal is fragmented when the position signal represents that the PUH passes the predetermined position of the optical disc.

* * * * *